(12) United States Patent
Imai et al.

(10) Patent No.: US 11,614,704 B2
(45) Date of Patent: Mar. 28, 2023

(54) INFORMATION PROCESSING APPARATUS, IMAGE FORMING APPARATUS, AND NON-TRANSITORY COMPUTER READABLE MEDIUM STORING PROGRAM

(71) Applicant: FUJIFILM Business Innovation Corp., Tokyo (JP)

(72) Inventors: Tomoya Imai, Kanagawa (JP); Daichi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/402,588

(22) Filed: Aug. 15, 2021

(65) Prior Publication Data

US 2022/0308513 A1 Sep. 29, 2022

(30) Foreign Application Priority Data

Mar. 29, 2021 (JP) .............................. JP2021-054593

(51) Int. Cl.
| | | |
|---|---|---|
| G03G 15/00 | (2006.01) | |
| G03G 21/00 | (2006.01) | |
| H04N 1/00 | (2006.01) | |
| G03G 21/20 | (2006.01) | |

(52) U.S. Cl.
CPC ........... *G03G 15/502* (2013.01); *G03G 21/20* (2013.01); *H04N 1/00424* (2013.01); *H04N 1/00427* (2013.01); *H04N 1/00437* (2013.01); *H04N 1/00978* (2013.01); *H04N 1/00992* (2013.01)

(58) Field of Classification Search
CPC .. G03G 15/5016; G03G 15/502; G03G 21/20; H04N 1/00424; H04N 1/00427; H04N 1/00437; H04N 1/00978; H04N 1/00992
See application file for complete search history.

(56) References Cited

U.S. PATENT DOCUMENTS

| | | |
|---|---|---|
| 8,736,870 B2 | 5/2014 | Nakagawa |
| 10,048,908 B2 | 8/2018 | Noda |
| 2018/0181042 A1* | 6/2018 | Ooba .................... G03G 15/502 |

FOREIGN PATENT DOCUMENTS

| | | |
|---|---|---|
| JP | H1069173 | 3/1998 |
| JP | 2010282427 | 12/2010 |
| JP | 6332236 | 5/2018 |

* cited by examiner

*Primary Examiner* — Sophia S Chen
(74) *Attorney, Agent, or Firm* — JCIPRNET

(57) ABSTRACT

An information processing apparatus includes a processor configured to display an operation screen for receiving an operation regarding setting information of an image forming apparatus that operates in association with the setting information with optimum values changing depending on external factors on a display device and receive an operation on the operation screen, in which the processor is configured to display a creation screen that is one of the operation screen and is used to newly create the setting information, on the display device, receive an input of a reason for creation of the new setting information on the creation screen and specify an item to be set corresponding to the received reason for creation among setting items in the setting information, and display the specified item on the operation screen to be identifiable with respect to other setting items.

11 Claims, 10 Drawing Sheets

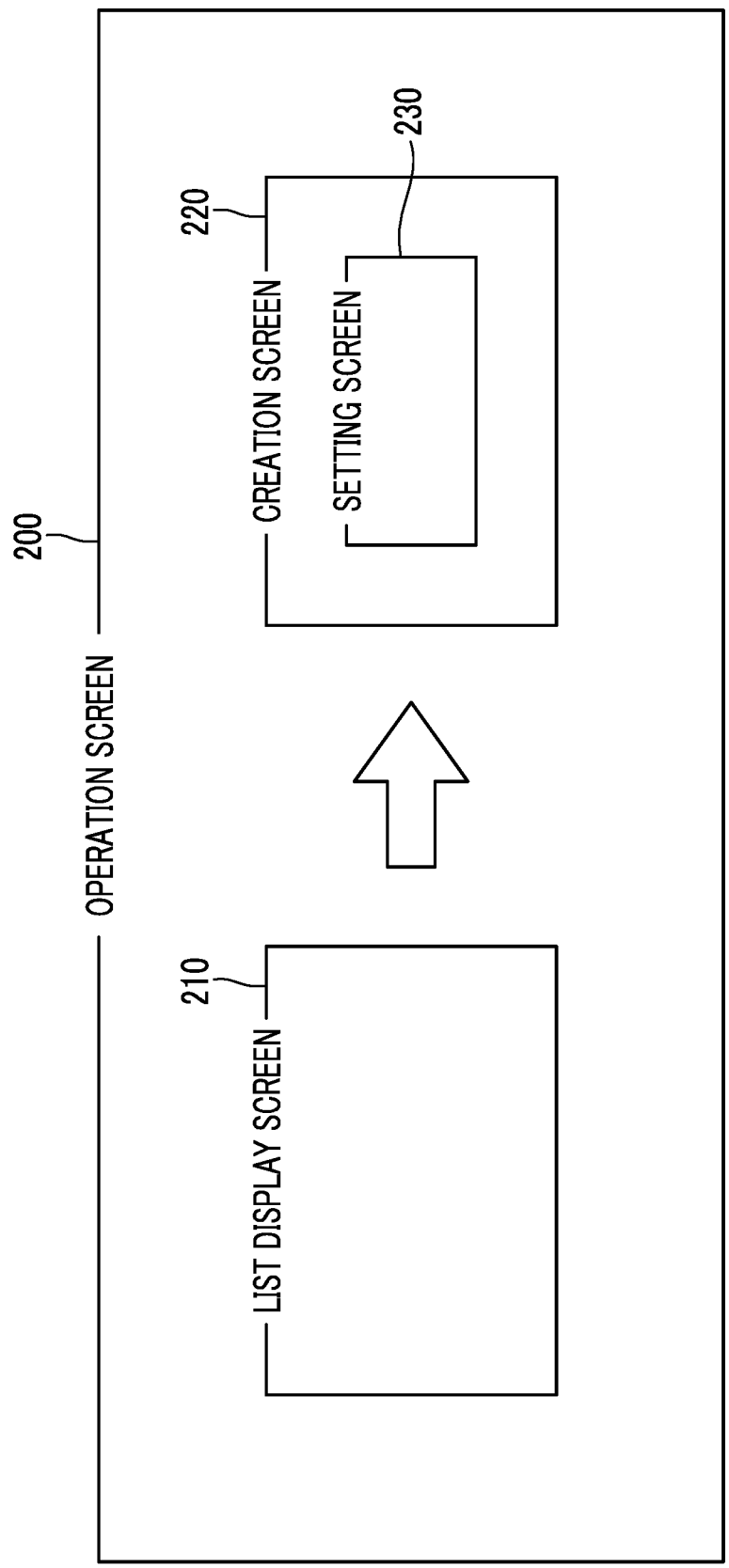

FIG. 3A

| FILE NAME | PARENT FILE | ATTRIBUTE 1 | ATTRIBUTE 2 | ... |
|---|---|---|---|---|
| FILE 1 | ABSENT | | | |
| FILE 2 | ABSENT | | | |
| FILE 3 | FILE 2 – HUMIDITY | | | |
| FILE 4 | FILE 2 – ATMOSPHERIC TEMPERATURE | | | |
| FILE 5 | ABSENT | | | |
| FILE 6 | FILE 5 | | | |
| ⋮ | | | | |

211 — CREATE

| FILE NAME | ATTRIBUTE 1 | ATTRIBUTE 2 | ATTRIBUTE 3 | ... |
|---|---|---|---|---|
| FILE 1 | | | | |
| FILE 2 | | | | |
| FILE 3 | | | | |
| FILE 4 | | | | |
| FILE 5 | | | | |
| FILE 6 | | | | |
| ⋮ | | | | |

211 — CREATE

210

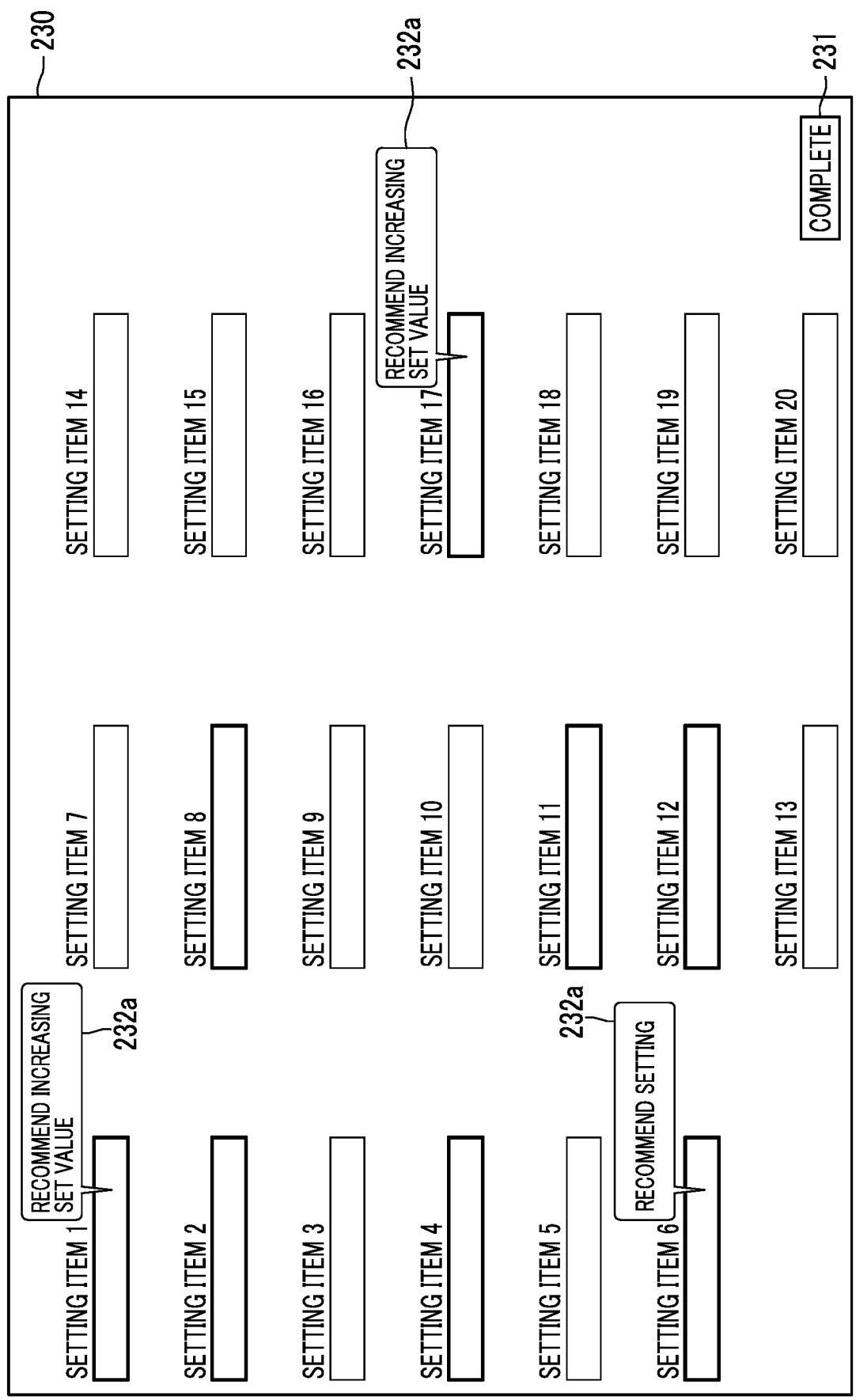

FIG. 7

| SETTING ITEM | REASON FOR CREATION | | SUGGESTION DISPLAY |
|---|---|---|---|
| | HIGH HUMIDITY OR LOW HUMIDITY | HIGH TEMPERATURE OR LOW TEMPERATURE | |
| ALIGNER ROLLER PRESSURE | ○ | ○ | |
| ALIGNMENT PROFILE | ○ | ○ | |
| TRANSFER OUTPUT ADJUSTMENT | – | ○ | |
| FIXING TEMPERATURE | ○ | – | DISPLAY CONDITION: AT LOW TEMPERATURE SELECTION<br>DISPLAY CONTENT: RECOMMEND INCREASING SET VALUE. |
| OPERATION PRIORITY OF FIXING UNIT | ○ | ○ | |
| PAPER CURL CORRECTION | ○ | ○ | DISPLAY CONDITION: AT HIGH HUMIDITY SELECTION<br>DISPLAY CONTENT: RECOMMEND INCREASING SET VALUE. |
| SIDE REGISTRATION CORRECTION | ○ | ○ | |
| AIR ASSIST ADJUSTMENT | ○ | ○ | |
| ADJUSTMENT OF PAPER FOLDING POSITION | – | – | |
| USE OF HEATER | ○ | ○ | DISPLAY CONDITION: AT LOW TEMPERATURE SELECTION<br>DISPLAY CONTENT: RECOMMEND SETTING. |
| DOUBLE FEED DETECTION | ○ | ○ | |

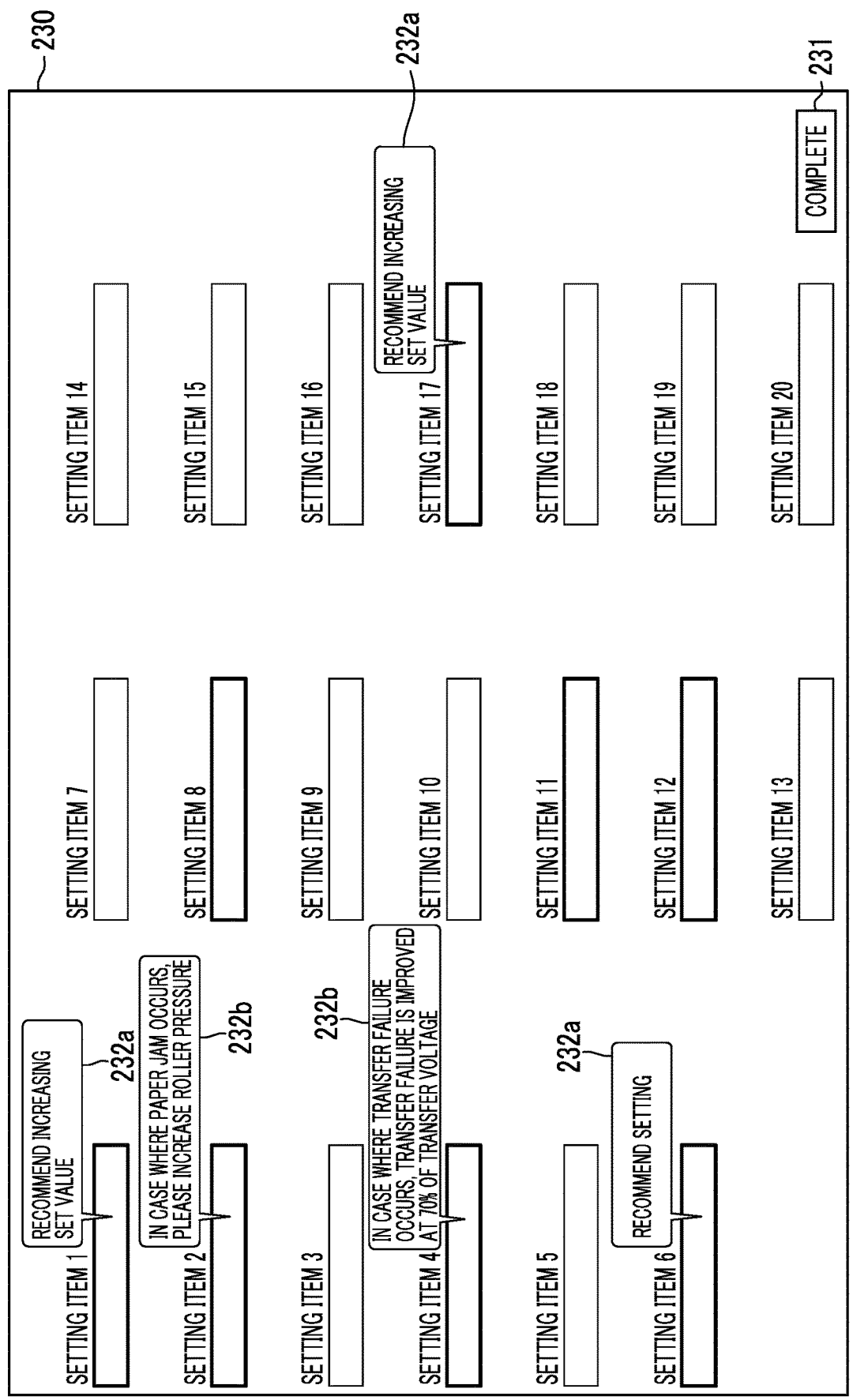

FIG. 9

| PRESENCE OR ABSENCE AND REASON FOR CREATION OF PARENT FILE | SETTING OF PARENT FILE ||||||| SETTING OF FILE TO BE NEWLY CREATED ||
|---|---|---|---|---|---|---|---|---|---|
| | BASIC SETTING ||| ADVANCED SETTING ||| REASON FOR CREATION | SUGGESTION DISPLAY ||
| | PAPER SIZE | ORIENTATION | PAPER TYPE | COATED PAPER | FIXING TEMPERATURE [T] | ALIGNER ROLLER PRESSURE | SECONDARY TRANSFER VOLTAGE [%] | | |
| ABSENT | - | - | - | - | - | - | - | - | ABSENT |
| PRESENT – REASON: HIGH HUMIDITY | A4 | LANDSCAPE | PLAIN PAPER | NON-COATED PAPER | - | ≠ 40 | - | HIGH TEMPERATURE | DISPLAY POSITION: ALIGNER ROLLER DISPLAY CONTENT: IN CASE WHERE PAPER JAM OCCURS IN ALIGNER PART, PLEASE INCREASE ALIGNER ROLLER PRESSURE. |
| PRESENT – REASON: HIGH HUMIDITY | A3 | - | PLAIN PAPER | NON-COATED PAPER | T < 10°C | - | - | LOW TEMPERATURE | DISPLAY POSITION: FIXING TEMPERATURE DISPLAY CONTENT: IN CASE WHERE COLOR UNEVENNESS OCCURS AT LEADING END OF PAPER, COLOR UNEVENNESS IS IMPROVED BY INCREASING FIXING TEMPERATURE. |
| PRESENT – REASON: LOW TEMPERATURE | A3 | - | PLAIN PAPER | NON-COATED PAPER | -15°C < T | - | - | LOW HUMIDITY | DISPLAY POSITION: FIXING TEMPERATURE DISPLAY CONTENT: IN CASE WHERE GLOSSINESS UNEVENNESS OCCURS AT LEADING END OF PAPER, GLOSSINESS UNEVENNESS IS IMPROVED BY DECREASING FIXING TEMPERATURE. |
| PRESENT – REASON: HIGH TEMPERATURE | A4 | PORTRAIT | PLAIN PAPER | COATED PAPER | - | - | ≠ 70 | HIGH HUMIDITY | DISPLAY POSITION: SECONDARY TRANSFER VOLTAGE DISPLAY CONTENT: IN CASE WHERE TRANSFER FAILURE OCCURS, TRANSFER FAILURE IS IMPROVED AT 70% OF SECONDARY TRANSFER VOLTAGE. |
| PRESENT – REASON: LOW TEMPERATURE | A4 | PORTRAIT | PLAIN PAPER | COATED PAPER | - | - | ≠ 80 | LOW HUMIDITY | DISPLAY POSITION: SECONDARY TRANSFER VOLTAGE DISPLAY CONTENT: IN CASE WHERE TRANSFER FAILURE OCCURS, TRANSFER FAILURE IS IMPROVED AT 80% OF SECONDARY TRANSFER VOLTAGE. |

INFORMATION PROCESSING APPARATUS, IMAGE FORMING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-054593 filed Mar. 29, 2021.

BACKGROUND

(i) Technical Field

The present invention relates to an information processing apparatus, an image forming apparatus, and a non-transitory computer readable medium storing a program.

(ii) Related Art

In an electrophotographic system, an electrostatic latent image is developed using charged toner. A charge amount of toner changes depending on an ambient environment, such as temperature or humidity. For example, in a case where ambient humidity is high, a charge amount of toner particles tends to decrease. Change in the charge amount of toner influences density or quality of an output image. In the related art, there is a case where control is performed for setting and storing operation conditions, such as printing parameters, on paper as an image forming target and operating an image forming apparatus based on such setting.

JP6332236B discloses an image forming apparatus that stores a paper profile including image forming conditions corresponding to paper in association with environment information of at least one of a temperature or humidity around the apparatus, in a case where the environment information is acquired, searches for paper profiles corresponding to current environment information acquired from among the stored paper profiles, and sorts or narrow downs and displays the searched paper profiles on a display unit.

JP1998-69173A discloses an image forming apparatus that includes a humidity sensor for detecting humidity, measures a period of paper left from when paper is set in a paper feed unit until image forming starts, in a case of high humidity, selects optimum transfer conditions corresponding to a storage state of paper before paper is set and a paper form or the period of paper left, and operates an electrostatic transfer unit under the selected transfer conditions.

SUMMARY

Optimum values of the operation conditions of the image forming apparatus are changed depending on external factors, such as an environment or a degree of contamination of paper. Accordingly, an image forming apparatus that selects setting information of operation conditions corresponding to external factors at the time of an operation and is subjected to operation control is known. The setting information may be selected from setting information prepared in advance or may be newly created corresponding to the external factors based on existing setting information.

Note that, in creating new setting information, contents of setting to be performed corresponding to the external factors depend on a unique index or experience of a person who performs the setting, and it is difficult for the person to perform appropriate setting objectively.

Aspects of non-limiting embodiments of the present disclosure relate to an information processing apparatus, an image forming apparatus, and a non-transitory computer readable medium storing a program that can facilitate identification of items to be set corresponding to a reason for creation and can reduce labor needed for newly creating setting information in selecting setting information of the image forming apparatus compared to a configuration in which setting items in setting information are merely displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to display an operation screen for receiving an operation regarding setting information of an image forming apparatus that operates in association with the setting information with optimum values changing depending on external factors on a display device and receive an operation on the operation screen, in which the processor is configured to display a creation screen that is one of the operation screen and is used to newly create the setting information, on the display device, receive an input of a reason for creation of the new setting information on the creation screen and specify an item to be set corresponding to the received reason for creation among setting items in the setting information, and display the specified item on the operation screen to be identifiable with respect to other setting items.

BRIEF DESCRIPTION OF THE DRAWINGS

Exemplary embodiment(s) of the present invention will be described in detail based on the following figures, wherein:

FIG. 2 is a diagram showing a kind of an operation screen for receiving a user's operation;

FIGS. 3A and 3B are diagrams showing a configuration example of a list display screen, and specifically, FIG. 3A is a diagram showing a list display screen where support display according to the exemplary embodiment is performed, and FIG. 3B is a diagram showing a list display screen in a state in which support display is not performed, as a comparison target;

FIG. 4A is a diagram showing a creation screen where support display according to the exemplary embodiment is performed, and FIG. 4B is a diagram showing a creation screen in a state in which support display is not performed, as a comparison target;

FIG. 6 is a diagram showing an example of a setting screen where suggestion display is performed;

FIG. 7 is a diagram showing an example of a correspondence relationship between a reason for creation of a new setting information file and suggestion display;

FIG. 8 is a diagram showing another example of a setting screen where suggestion display is performed;

FIG. 9 is a diagram showing an example of a correspondence relationship of a reason for creation of a new setting information file, and setting and a reason for creation of a parent file, and suggestion display.

DETAILED DESCRIPTION

Hereinafter, an exemplary embodiment of the invention will be described referring to the accompanying drawings.

Overall Configuration

Figure 1:
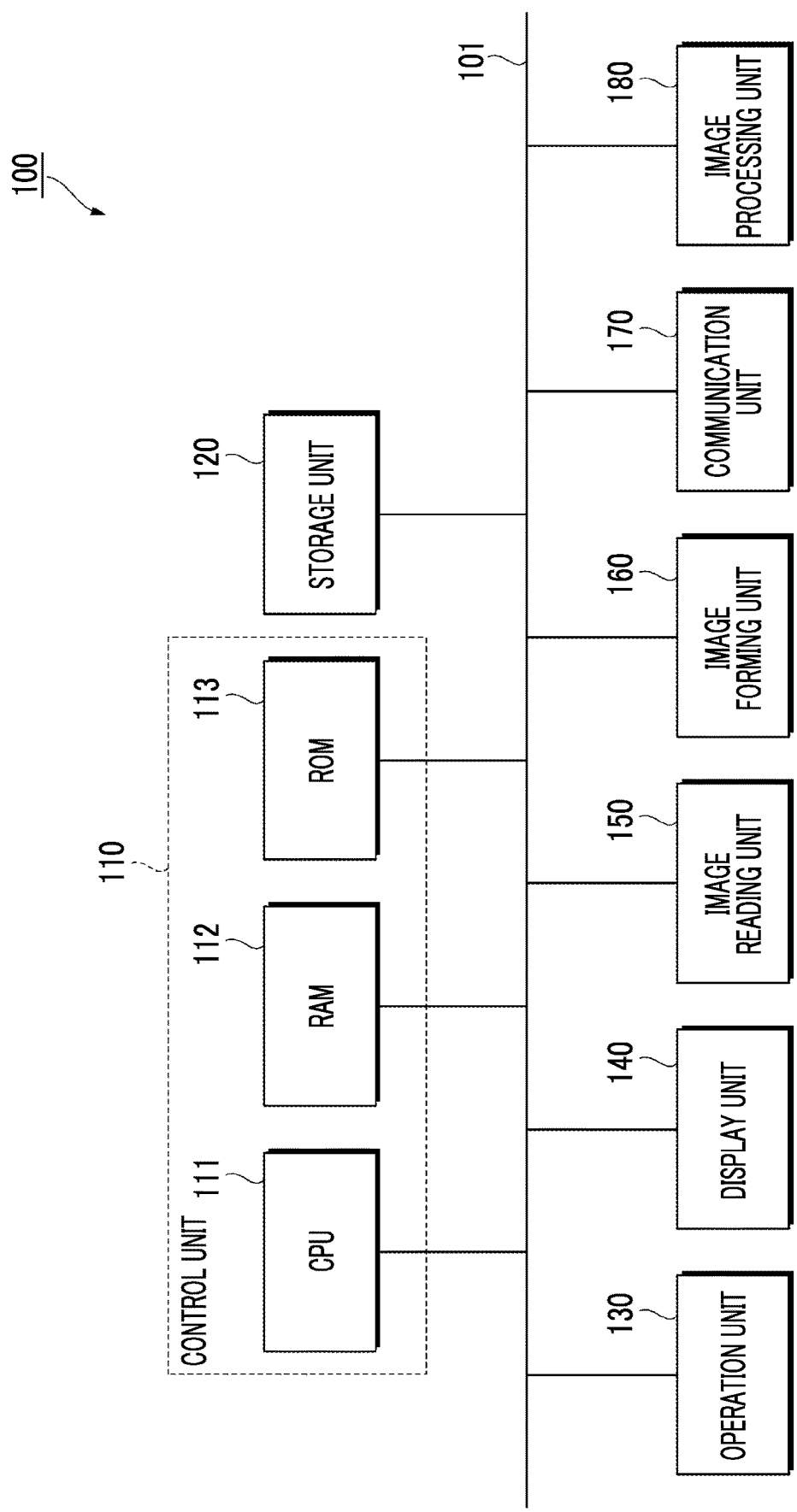
FIG. 1 is a diagram showing the configuration of an image forming apparatus to which an exemplary embodiment is applied.

FIG. 1 is a diagram showing the configuration of an image forming apparatus 100 to which the exemplary embodiment is applied. The image forming apparatus 100 includes a control unit 110, a storage unit 120, an operation unit 130, a display unit 140, an image reading unit 150, an image forming unit 160, a communication unit 170, and an image processing unit 180. The respective functional units are connected to a bus 101 and transfer data via the bus 101.

The control unit 110 controls the respective functional units in the image forming apparatus 100. The control unit 110 is a functional unit that executes various kinds of data processing. The control unit 110 includes a central processing unit (CPU) 111 as an arithmetic unit, and a random access memory (RAM) 112 and a read only memory (ROM) 113 as a storage unit. The RAM 112 is a main storage device (main memory) and is used as a work memory when the CPU 111 executes arithmetic processing. The ROM 113 stores programs or data, such as set values prepared in advance, and the CPU 111 reads the programs or data directly from the ROM 113 and executes processing. The programs or data are also stored in the storage unit 120. The CPU 111 reads a program stored in the storage unit 120 to the RAM 112 and executes the program.

The storage unit 120 is a functional unit that stores various kinds of data generated by various operations, such as data of images read by the image reading unit 150, in addition to storing the programs to be executed by the CPU 111 or data as described above. The storage unit 120 is realized by, for example, a storage device, such as a magnetic disk device or a solid state drive (SSD).

The operation unit 130 is a functional unit that receives a user's operation. The operation unit 130 is configured with, for example, hardware keys or a touch sensor that outputs a control signal corresponding to a position pressed or touched by a finger or the like. The operation unit 130 may be configured as a touch panel in which the touch sensor and a liquid crystal display configuring the display unit 140 are combined.

The display unit 140 is a functional unit that displays information images for presenting various kinds of information to the user, preview images of images to be a target of processing, such as reading or output, an operation image for allowing the user to perform an operation, and the like. The display unit 140 is configured with, for example, a liquid crystal display. The above-described operation unit 130 and the display unit 140 can be combined and used as a user interface unit for the user to input and output information to and from the image forming apparatus 100.

The image reading unit 150 is a functional unit that optically reads an image on a document. As a reading system of an image, for example, a charge coupled devices (CCD) system in which reflected light of light emitted from a light source to the document is reduced by a lens and received by a CCD, or a contact image sensor (CIS) system in which reflected light of light emitted from a light emitting diode (LED) light source to the document in order is received by a CIS is used.

The image forming unit 160 is a functional unit that forms an image based on image data on a recording material, such as paper, using an image forming material. As a system for forming an image on a recording material, for example, an electrophotographic system that uses toner as an image forming material and transfers toner attached to a photoreceptor to the recording material to form an image is used.

The communication unit 170 is a functional unit that transmits and receives commands or data to and from an external apparatus. As the communication unit 170, an interface corresponding to a communication system with the external apparatus is used. Connection to the external apparatus may be performed via a network or may be performed by direct connection. A communication line may be a wired line or may be a wireless line.

The image processing unit 180 is a functional unit that includes a processor as an arithmetic unit and a work memory, and executes image processing, such as color correction or gradation correction, an image represented by image data. The CPU 111 of the control unit 110 may also be used as the processor, and the RAM 112 of the control unit 110 may also be used as the work memory.

Operation Screen

In the image forming apparatus 100, in an operation to form an image by the image forming unit 160 and output a printed matter, optimum values of setting regarding an operation by a function are changed depending on external factors, such as an outside air temperature, humidity, a temperature inside the apparatus, and a kind of paper. Accordingly, at the time of an operation, setting of the operation is selected corresponding to the external factors and operation control is performed. In the image forming apparatus 100 of the exemplary embodiment, as a setting method at the time of the operation, a setting information file in which set values on various setting items are recorded is used. In this case, the user selects an appropriate setting information file corresponding to the external factors at the time of the operation. Then, the control unit 110 applies the setting recorded in the selected setting information file to control the operations of the respective functional units. In a case where there is no setting information file conforming to an environment or operation conditions at the time of the operation, the user creates and uses a new setting information file conforming to the environment or the operation conditions at the time of the operation.

Here, as a method of creating a new setting information file, a method that uses an existing setting information file and changes a set value of a setting item needed to be changed to make a new setting information file is considered. A setting information file in which the environment or operation conditions are approximate to the environment or the operation conditions at the time of the operation using the new setting information file is used as the existing setting information file, whereby it is possible to reduce labor of changing the setting. For example, in a case where there is an existing setting information file in which the conditions, such as an outside air temperature or a kind of paper, are identical and only a condition of humidity is different, only setting that is influenced by humidity may be changed based on the existing setting information file. Hereinafter, the existing setting information file that is a base of the new setting information file is referred to as a parent file to the new setting information file.

The image forming apparatus 100 of the exemplary embodiment presents information and the like of setting contents to be changed on an operation screen on which a setting information file is created and supports a user's operation to change setting. With this, labor in creating a new setting information file is further reduced. Although information that is displayed to support an operation to change setting includes various kinds of information as described below, hereinafter, in contrast with display of a creation screen 220 and a setting screen 230 that are displayed in creating a new setting information file without specifying a parent file, display that is additionally performed in a case of specifying a parent file to create a new setting information file is collectively referred to as support display.

FIG. 2 is a diagram showing a kind of an operation screen for receiving a user's operation. An operation screen 200 is displayed on the display unit 140, for example, under the control of the control unit 110 in the image forming apparatus 100. The operation screen 200 includes a list display screen 210 and the creation screen 220. The list display screen is a screen that displays a list of existing setting information files. The creation screen 220 is a screen that is used to newly create a setting information file. The creation screen 220 includes the setting screen 230 for performing detailed setting. In a case where one of the setting information files displayed in a list on the list display screen 210 is selected, the creation screen 220 displays the selected setting information file as a parent file. The creation screen 220 on which the parent file is selected and displayed is in a state in which the set value of the selected parent file is input in each setting item.

Configuration Example of List Display Screen

FIGS. 3A and 3B are diagrams showing a configuration example of the list display screen 210. FIG. 3A is a diagram showing a list display screen 210 where support display according to the exemplary embodiment is performed, and FIG. 3B is a diagram showing a list display screen 210 in a state in which support display is not performed, as a comparison target. As shown in FIG. 3A, on the list display screen 210, a file name (in the example shown in the drawing, "file 1" to "file 6"), information of a parent file by support display, and attribute information (in the example shown in the drawing, "attribute 1", "attribute 2", . . . ) are displayed for each setting information file. Information of a parent file is the presence or absence of a parent file and in a case where a parent file is present, identification information of the parent file. In contrast, in the configuration shown in FIG. 3B, information of a parent file is not displayed, and only attribute information is displayed.

In the example shown in FIG. 3A, a parent file is absent for the files 1, 2, and 5 (in the example shown in the drawing, displayed as "absent"). A setting information file for which a parent file is absent means a setting information file created by newly setting all setting items, not a setting information file created based on an existing setting information file. The file 3 and the file 4 have the file 2 as a parent file. Here, in regard to the file 3, information of "humidity" is shown in addition to the identification information of the parent file as support display, and in regard to the file 4, information of "atmospheric temperature" is shown in addition to the identification information of the parent file as support display. The support display will be described below. The file 6 has the file 5 as a parent file. In the example shown in FIG. 3A, all setting information files (here, the file 2 and the file 5) to be a parent file are a setting information file having no parent file. Note that a new setting information file may be created with a setting information file having a parent file as a parent file. For example, a new setting information file may be created with the file 3, 4, or 6 shown in FIG. 3A as a parent file.

The attribute information is information indicating an attribute of paper to be a target of image forming processing. Although a specific attribute is not particularly shown in the example shown in FIG. 3A, for example, information, such as a paper size, a kind of paper, and the presence or absence of additional processing, is shown. The additional processing is, for example, binding processing or processing of punching a punch hole on paper after image forming.

A create button 211 is displayed on the list display screen 210. The create button 211 is a button object for inputting a command for instructing new creation of a setting information file. In a case where the user selects the create button 211 on the list display screen 210, the operation screen 200 is switched from the list display screen 210 to the creation screen 220. The selection of the create button 211 is performed, for example, in such a manner that the user touches a position of the create button 211 using the operation unit 130 provided integrally with the display unit 140 as the touch panel.

Configuration Example of Creation Screen

Figure 4A:
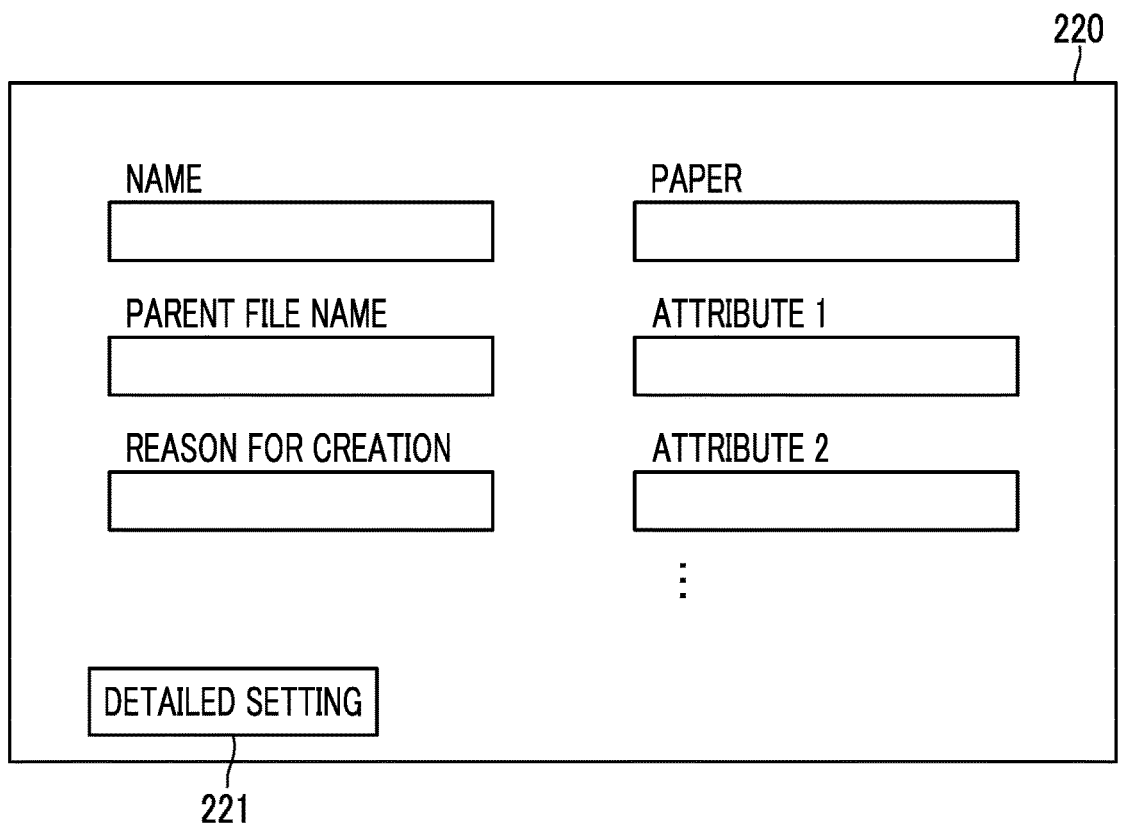
FIGS. 4A and 4B are diagrams showing a configuration example of a creation screen, and specifically.
Figure 4B:
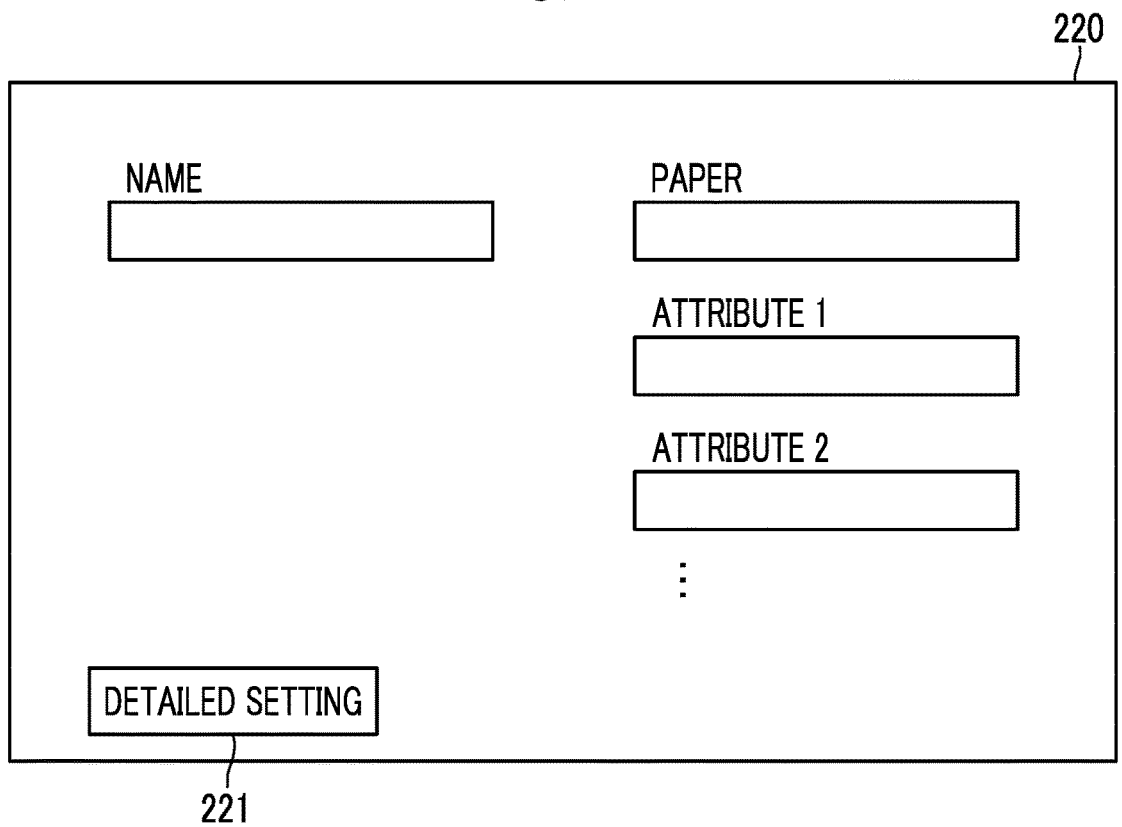

FIG. 4 is a diagram showing a configuration example of the creation screen 220. FIG. 4A is a diagram showing a creation screen 220 where support display according to the exemplary embodiment is performed, and FIG. 4B is a diagram showing a creation screen 220 in a state in which support display is not performed, as a comparison target. As shown in FIG. 4A, on the creation screen 220, a parent file name and a reason for creation by support display are displayed along with a name of a setting information file to be newly created, a kind of paper to be processed, and an attribute (in the example shown in the drawing, "attribute 1", "attribute 2", . . . ). In contrast, in the configuration shown in FIG. 4B, there are no items of the parent file name and the reason for creation, and only the respective items of the name of the setting information file, the kind of paper, and the attribute information are displayed.

In the example shown in FIG. 4A, the parent file name is information for specifying the parent file to be a base of the setting information file to be newly created. This information may be information capable of specifying the parent file and is not limited to the file name. In a case where a name of an existing setting information file is displayed in the item, the setting information file to be newly created initially succeeds to the setting of the existing setting information file. On the other hand, in a case where a name of an existing setting information file is not displayed in the item, this means that a parent file is absent for a setting information file to be newly created. This is, for example, a case where a parent file is not selected on the list display screen 210 and transition is made to the creation screen 220.

In the example shown in FIG. 4A, the reason for creation means a reason for which a new setting information file is created based on a parent file. Specifically, the reason for creation is information for specifying a portion in an environment or operation conditions in which a setting information file to be newly created is used, different from an environment or operation conditions in which a parent file is used. In a case of creating a new setting information file with one setting information file as a parent file, there are partial differences, such as high humidity and a low atmospheric temperature, from the environment or the operation conditions in which the parent file is used, and there is a need to create a setting information file corresponding to the differences. Accordingly, information, such as humidity and a temperature, indicating items having contents different from the environment or the operation conditions in which the parent file is used is input to the reason for creation. The input of information to the reason for creation may be configured, for example, such that the user selects and inputs an item from a menu on which selectable items are arranged or may be configured such that the user inputs text by an operation, such as a key input. The input by the menu is performed, for example, in such a manner that the user touches an input column of the reason for creation to display the menu, and then, touches an item relevant to the reason for creation, using the operation unit 130 provided integrally with the display unit 140 as the touch panel. The input of information to the reason for creation may be enabled, for example, only in a case where the name of the existing setting information file is displayed in the column of the parent file name. In a case where the input of information to the reason for creation is not performed, the setting contents of the setting information file to be newly created are initially identical to the setting contents of the parent file.

On the creation screen 220, in a case where the parent file and the reason for creation are specified and the new setting information file is created, information of the parent file and information of the reason for creation are included as attributes in the created setting information file. Then, in a case where the setting information file is displayed on the list display screen 210, the specified parent file and reason for creation are displayed in the item of the parent file of the list display screen 210 shown in FIG. 3A.

A detailed setting button 221 is displayed on the creation screen 220. The detailed setting button 221 is a button object for editing setting information of a setting information file to be newly created. In a case where the user selects the detailed setting button 221 on the creation screen 220, the operation screen 200 is switched to the setting screen 230 on the creation screen 220. The selection of the detailed setting button 221 is performed, for example, in such a manner that the user touches a position of the detailed setting button 221 using the operation unit 130 provided integrally with the display unit 140 as the touch panel.

Configuration Example of Setting Screen

Figure 5:
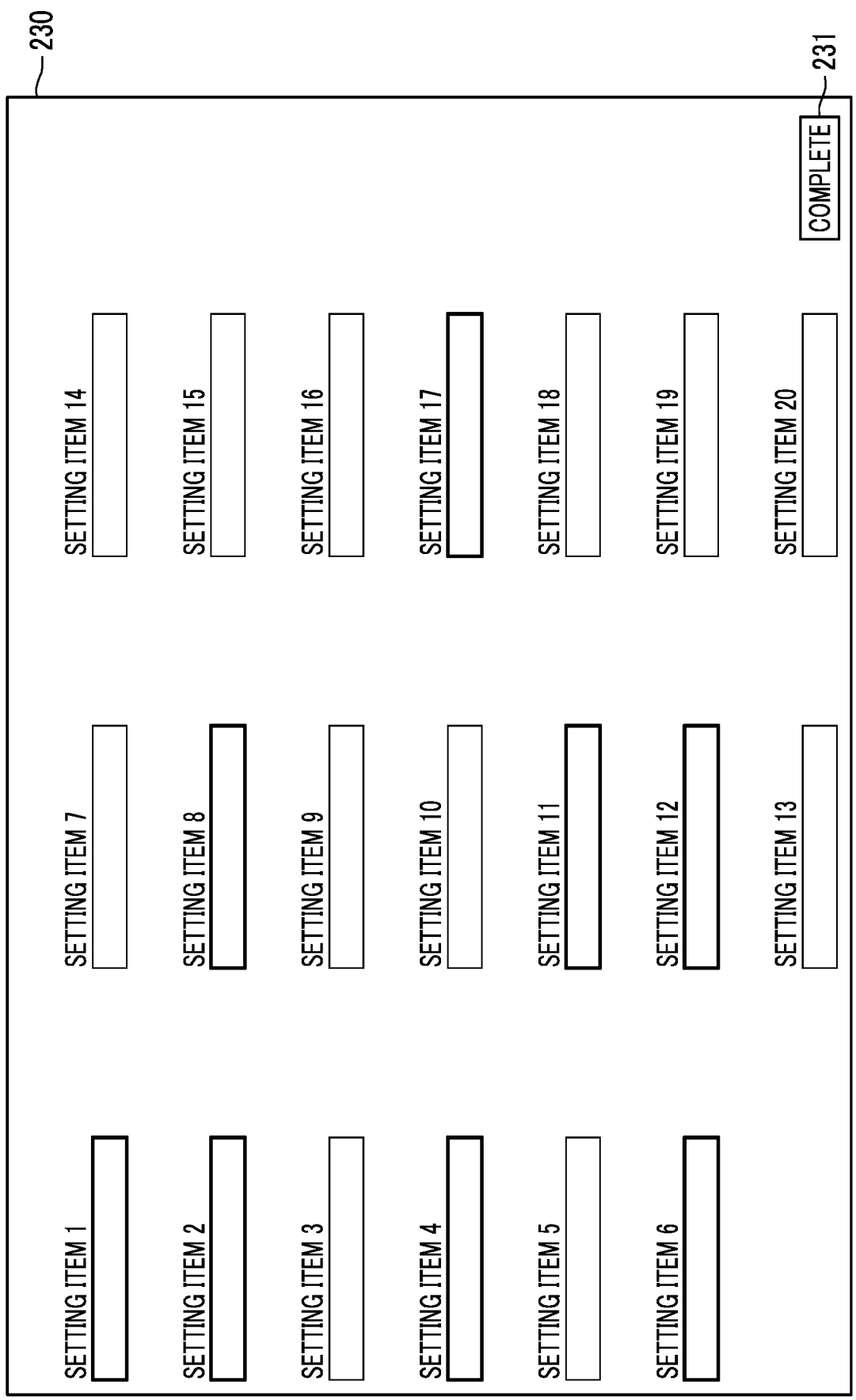
FIG. 5 is a diagram showing a configuration example of a setting screen.

FIG. 5 is a diagram showing a configuration example of the setting screen 230. Setting items (in the example shown in the drawing, "setting item 1" to "setting item 20") where an input can be performed are displayed on the setting screen 230. Each setting item can be individually set. The input of the setting item may be configured, for example, such that the user selects and inputs a set value from a menu on which selectable set values are arranged or may be configured such that the user inputs a set value by an operation, such as a key input. The input by the menu is performed, for example, in such a manner that the user touches an input column of each setting item to display the menu, and then, touches a value intended to set, using the operation unit 130 provided integrally with the display unit 140 as the touch panel.

Here, a case where the creation screen 220 of the new setting information file is displayed based on the parent file, and transition is made to the setting screen 230 is considered. In this case, it has been described that the setting information file to be newly created initially succeeds to the setting of the parent file. Accordingly, the set value of each setting item on the setting screen 230 is identical to the set value of each setting item of the parent file.

It is assumed that an input of information to the reason for creation is performed on the creation screen 220. In this case, a setting item that is influenced by the input reason for creation is specified. For example, in image forming processing, in a case where humidity in the environment or the operation conditions is different, there is a need to set a setting item of a temperature in fixing processing of an image, strength of paper curl correction, or the like corresponding to humidity. In a case where the outside air temperature in the environment or the operation conditions is different, there is a need to set a setting item of a transfer output for transferring toner from the photoreceptor to the recording material, or the like corresponding to the outside air temperature. In this way, a setting item to be influenced is different depending on the input reason for creation. Accordingly, in the exemplary embodiment, as support display, a setting item that is influenced by the input reason for creation, in other words, an item to be set is displayed on the setting screen 230 to be identifiable with respect to other setting items.

In regard to the support display, any method may be applied as along as an item to be set is identifiable with respect to other setting items, and a specific display method is not limited. For example, a method in which a display color or brightness is different between the item to be set and other setting items or a method in which a specific mark or symbol is added to the item to be set is considered. In the example shown in FIG. 5, the item to be set (in the example shown in the drawing, "setting item 1", "setting item 2", "setting item 4", "setting item 6", "setting item 8", "setting item 11", "setting item 12", and "setting item 17") is described with a thick-bordered frame to be identified with respect to other setting items.

The setting of each setting item may be configured, for example, in such a manner that the user selects and inputs a set value from a menu on which selectable set values are arranged or may be configured in such a manner that the user input text of a set value by an operation, such as a key input. The input by the menu is performed, for example, in such a manner that the user touches a setting item intended to input to display the menu, and then, touches any set value shown on the menu, using the operation unit 130 provided integrally with the display unit 140 as the touch panel.

A complete button 231 is displayed on the setting screen 230. The complete button 231 is a button object for deciding the setting content and returning to the creation screen 220. In a case where the user selects the complete button 231 on the setting screen 230, the setting is decided with the contents of the setting screen 230 at this time, and the operation screen 200 is switched from the setting screen 230 to the creation screen 220. The selection of the complete button 231 is performed, for example, in such a manner that the user touches a position of the complete button 231 using the operation unit 130 provided integrally with the display unit 140 as the touch panel.

In the example shown in FIG. 5, as support display, display for presenting an item to be set to the user based on the selected parent file and reason for creation is performed. Alternatively, as support display, display of information regarding the setting content on the presented item to be set, more specifically, display for suggesting how the item should be set may be further performed. Hereinafter, display for suggesting setting on the setting screen 230 is referred to as suggestion display.

FIG. 6 is a diagram showing an example of the setting screen 230 where suggestion display is performed. In the example shown in FIG. 6, suggestion display is performed for the setting items 1, 6, and 17 on the setting screen 230 shown in FIG. 5. The suggestion display can be displayed, for example, using a so-called tooltip or the like. In this case, the user selects one of the setting items displayed on the setting screen 230 and performs a display operation, such as mouse over, whereby the suggestion display regarding the selected setting item is performed. The content of the suggestion display is prepared in advance in association with the reason for creation input in creating a new setting information file and is specified corresponding to the input reason for creation on the creation screen 220.

FIG. 7 is a diagram showing an example of a correspondence relationship between a reason for creation of a new setting information file and suggestion display. In the example shown in FIG. 7, a display condition and a display content of suggestion display that can be displayed in a case where humidity or a temperature is input as the reason for creation are defined. A case where humidity is input as a reason for creation is a case of creating a setting information file that is used in an environment in which humidity is different from an environment in which a parent file is used. A case where a temperature is input as a reason for creation is a case of creating a setting information file that is used in an environment in which a temperature is different from an environment in which a parent file is used. In regard to the reason for creation, not only humidity or a temperature may be simply input, but also whether humidity is high or low or a temperature is high or low with respect to an environment in which a parent file is used may be specified (in FIG. 7, described as "high humidity or low humidity" and "high temperature or low temperature").

In the example shown in FIG. 7, the items to be set corresponding to the reason for creation are shown by "○". For example, an item "aligner roller pressure" is an item to be set even though the reason for creation is any one of humidity or a temperature. An item "transfer output adjustment" is an item to be set in a case where the reason for creation is temperature. An item "fixing temperature" is an item to be set in a case where the reason for creation is humidity. An item "adjustment of paper folding position" is not an item to be set even though the reason for creation is any of humidity or a temperature. A setting item that is an item to be set corresponding to the reason for creation is displayed to be identifiable with respect to other setting items as support display as shown in FIGS. 6 and 7.

In the example shown in FIG. 7, in a case where an item "fixing temperature", "paper curl correction", or "use of heater" is relevant to an item to be set, suggestion display corresponding to the above-described display operation is performed. For example, in regard to the item "fixing temperature", in a case where the reason for creation is a low temperature compared to the environment in which the parent file is used, suggestion display of a message "Recommend increasing set value." is performed with the case as a display condition (in FIG. 7, described as "display condition: at low temperature selection"). In regard to the item "paper curl correction", in a case where the reason for creation is high humidity compared to the environment in which the parent file is used, suggestion display of a message "Recommend increasing set value." is performed with this case as a display condition (in FIG. 7, described as "display condition: at high humidity selection". In regard to the item "use of heater", in a case where the reason for creation is a low temperature compared to the environment in which the parent file is used, suggestion display of a message "Recommend setting." is performed with this case as a display condition (in FIG. 7, described as "display condition: at low temperature selection"). Referring to the setting screen 230 of FIG. 6, a message 232*a* "Recommend increasing set value" is displayed as the suggestion display on the setting items 1 and 17. A message 232*a* "Recommend setting" is displayed as the suggestion display on the setting item 6.

The individual setting items, the reasons for creation, the items to be set corresponding to the reasons for creation, and the display conditions and the display contents of the suggestion display shown in FIG. 7 are illustrative, and the invention is not limited to the contents shown in the drawing. In a case where the reason for creation is humidity, different suggestion display may be performed between a case where humidity is high compared to the environment in which the parent file is used and a case where humidity is low compared to the environment in which the parent file is used. Similarly, in a case where the reason for creation is a temperature, different suggestion display may be performed between a case where a temperature is high compared to the environment in which the parent file is used and a case where a temperature is low compared to the environment in which the parent file is used.

In the example shown in FIG. 6, as the support display, the suggestion display is performed corresponding to the reason for creation of the new setting information file. The suggestion display may be performed further in consideration of not only the reason for creation of the new setting information file, but also the setting or the reason for creation of the parent file.

FIG. 8 is a diagram showing another example of the setting screen 230 where suggestion display is performed. In the example shown in FIG. 8, suggestion display 232*b* is further performed for the setting items 2 and 4 on the setting screen 230 shown in FIG. 6. Similarly to the suggestion display shown in FIG. 6, the suggestion display shown in FIG. 8 is performed corresponding to a display operation, such as mouse over, using a so-called tooltip or the like. A content of the suggestion display is prepared in advance in association with the setting or the reason for creation of the parent file, in addition to the reason for creation input in creating the new setting information file, and is specified corresponding to the parent file selected on the list display screen 210 and the reason for creation input on the creation screen 220.

FIG. 9 is a diagram showing an example of a correspondence relationship of the reason for creation of the new setting information file and the setting and the reason for creation of the parent file, and the suggestion display. In the example shown in FIG. 9, a display position and a display content of suggestion display in a case where the setting and the reason for creation of the parent file and the reason for creation of the new setting information file are a specific combination are defined. In the example shown in the drawing, the setting of the parent file includes, as basic setting, items "paper size", "orientation", "paper type", and "coated paper", and includes, as detailed setting (in FIG. 9, described as "advanced setting"), items "fixing temperature", "aligner roller pressure", and "secondary transfer voltage".

In the setting items of the parent file, "paper size" is a size of paper that is a target in a case where image forming processing is performed with the setting by the parent file. "Orientation" is a transport direction of paper in the image forming processing. "Paper type" is a type of paper in the image forming processing. "Coated paper" indicates whether paper is coated paper or non-coated paper in the image forming processing. "Fixing temperature" is a temperature that is applied in fixing processing in the image forming processing. "Aligner roller pressure" is pressure that is given to paper by an aligner roller in the image forming processing. "Secondary transfer voltage" is a voltage that is applied in secondary transfer processing in the image forming processing. For example, referring to a second row in FIG. 9, in a case where the reason for creation of the parent file is "high humidity", "paper size" is A4, "orientation" is landscape, "paper type" is plain paper, "coated paper" is non-coated paper, and a value of "aligner roller pressure" is 40, and the reason for creation of the new setting information file is "high temperature", suggestion display is performed corresponding to a display operation. In this case, a suggestion display of a message "In case where paper jam occurs in aligner part, please increase aligner roller pressure" is performed at a display position (in FIG. 9, described as "display position: aligner roller") of the setting item of the aligner roller.

Here, in comparison of a third row and a fourth row in FIG. 9, the setting of "fixing temperature" is different from the reason for creation of the parent file, and other setting in the parent file and the reason for creation of the new setting information file are common. Note that a display message of suggestion display is "in case where color unevenness occurs at leading end of paper, color unevenness is improved by increasing fixing temperature." in the third row, and is "in case where glossiness unevenness occurs at leading end of paper, glossiness unevenness is improved by decreasing fixing temperature." in the fourth row. Accordingly, different suggestion display is performed due to differences in the reason for creation and the setting of the parent file. A first row in FIG. 9 is a case where a parent file is not selected, and suggestion display is not performed on the setting screen 230.

The individual setting items, the reasons for creation, the display positions and the display contents of the suggestion display shown in FIG. 9 are illustrative, and the invention is not limited to the contents shown in the drawing. Information shown in FIG. 9 may be set for a combination of a setting item on which suggestion display should be performed and a reason for creation, and does not need to be prepared for all combinations.

Information described referring to FIGS. 7 and 9 are stored, for example, as a database in the storage unit 120 or the like. The support display and the suggestion display described above are performed corresponding to an input operation to give an instruction to create a setting information file or a display operation of suggestion display by the user under the control of the control unit 110. The configuration of the list display screen 210 shown in FIGS. 3A and 3B, the configuration of the creation screen 220 shown in FIGS. 4A and 4B, the configuration of the setting screen 230 shown in FIGS. 5, 6, and 8, and the setting items or the setting contents, the display messages, and the like shown in FIGS. 7 and 9 are just illustrative, and the invention is not limited to the contents shown in the drawings.

Creation Operation of Setting Information File

Figure 10:
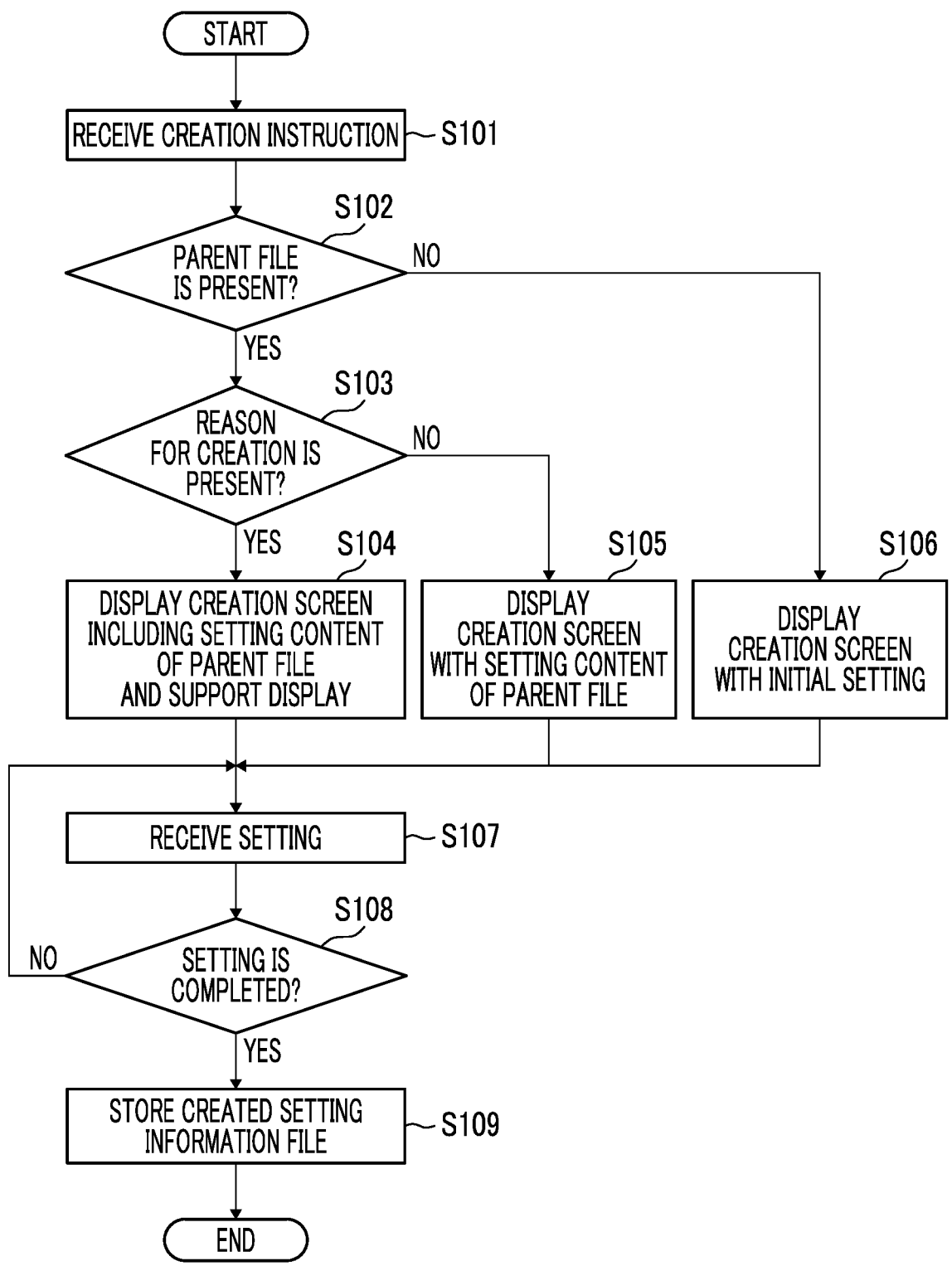
FIG. 10 is a flowchart showing a creation operation of a setting information file by the image forming apparatus.

FIG. 10 is a flowchart showing a creation operation of a setting information file by the image forming apparatus 100. As an initial state, it is assumed that the list display screen 210 is displayed on the display unit 140 of the image forming apparatus 100. First, a user's operation on the list display screen 210 is performed, and the control unit 110 receives a creation instruction of a new setting information file (S101). In the creation instruction, in a case where a parent file is selected (in S102, YES), and a reason for creation is input (in S103, YES), the control unit 110 displays a creation screen including the setting contents and support of the parent file and support display on the display unit 140 (S104). Here, the support display includes display for making an item to be set identifiable with respect to other setting items and suggestion display. Note that the suggestion display is displayed based on the reason for creation and the setting of the parent file and the reason for creation of the new setting information file in a case where a display operation, such as mouse over, is performed for a setting item on which suggestion display is set. The user may change the setting contents copied from the parent file based on the support display and the suggestion display or user's determination on the creation screen 220 and the setting screen 230.

In the creation instruction of the setting information file, in a case where a parent file is selected (in S102, YES), and a reason for creation is not input (in S103, NO), the control unit 110 displays a creation screen on the display unit 140 with the setting contents of the parent file (S105). The user may change the setting contents copied from the parent file based on user's determination.

In the creation instruction of the setting information file, in a case where a parent file is not selected (in S102, NO), the control unit 110 displays a creation screen on the display unit 140 with predetermined initial setting regardless of setting of an existing setting information file (S106). The user may change the setting contents based on user's determination.

On the creation screen 220 and the setting screen 230, in a case where the setting input by the user operation is received (in S107 and S108, NO), and the setting of the new setting information file is completed (in S108, YES), the control unit 110 stores the created setting information file in the storage unit 120 (S109).

Although the exemplary embodiment of the invention has been described above, the technical scope of the invention is not limited to the above-described exemplary embodiment. For example, in the above-described exemplary embodiment, although the setting of the new setting information file is changed by a user's operation based on the support display and the suggestion display, control may be performed for automatically performing setting or restricting change of setting depending on the setting of the parent file and the reason for creation of the new setting information file.

In the exemplary embodiment, as the support display on the setting screen 230, display for making an item to be set identifiable with respect to other setting items is performed. In addition, a setting item on which a setting operation is actually performed and a setting item on which a setting operation is not yet performed may be displayed to be identifiable. In this case, any method may be applied as long as an item on which a setting operation is performed is identifiable with respect to other setting items, and a specific display method is not limited. For example, a display color or brightness may be made different or a specific mark or symbol may be added to make an item on which a setting operation is performed, identifiable with respect to other setting items. In addition, the invention includes various alterations or replacements of the configuration without departing from the scope of the technical spirit of the invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to display an operation screen for receiving an operation regarding setting information of an image forming apparatus that operates in association with the setting information with optimum values changing depending on external factors on a display device and receive an operation on the operation screen,
wherein the processor is configured to:
display a creation screen that is included in the operation screen and is used to newly create the setting information, on the display device;
receive a user's input on the creation screen and specify an item to be set corresponding to the user's input among setting items in the setting information;
display the specified item on the operation screen to be identifiable with respect to other setting items; and
display information regarding setting of the item in the user's input on the specified item on the operation screen, wherein the information regarding the setting is information for suggesting a setting content to be performed corresponding to the user's input.

2. The information processing apparatus according to claim 1, wherein the processor is configured to:
receive a setting operation for the specified item and display a setting content by the setting operation on the operation screen to be identifiable with respect to setting contents of other setting items for which no setting operation is performed.

3. The information processing apparatus according to claim 1, wherein the processor is configured to:
designate one piece of the setting information already created and receive an instruction to create the new setting information based on the designated setting information, and
specify an item to be set corresponding to the designated setting information and the user's input on the creation screen.

4. The information processing apparatus according to claim 3, wherein the processor is configured to:
display a list display screen that is included in the operation screen and displays a list of the setting information already created, on the display device, and
perform display indicating a relationship between the one piece of setting information and setting information created based on the setting information, on the list display screen.

5. The information processing apparatus according to claim 4, wherein the processor is configured to:
display the user's input on setting information created with the reception of the user's input, on the list display screen.

6. An image forming apparatus that operates in association with setting information with optimum values changing depending on external factors, the image forming apparatus comprising:
a storage unit that stores the setting information;
a display unit that displays an operation screen for receiving an operation regarding the setting information; and
a control unit that controls an operation of the image forming apparatus based on the setting information,
wherein a creation screen that is included in the operation screen displayed on the display unit and is used to newly create the setting information is capable of receiving a user's input, and in a case where the user's input is received, a setting item specified corresponding to the user's input is displayed on the operation screen to be identifiable with respect to other setting items,
wherein information for suggesting a setting content to be performed on the setting item corresponding to the user's input on the setting item specified corresponding to the user's input is displayed on the operation screen displayed on the display unit.

7. The image forming apparatus according to claim 6, wherein a setting operation for the setting item is capable of being received on the operation screen displayed on the display unit, and in a case where setting operation is received, a setting content by the setting operation is displayed on the operation screen to be identifiable with respect to setting contents of other setting items for which no setting operation is performed.

8. The image forming apparatus according to claim 6, wherein, on setting information created with the reception of the user's input, the user's input is displayed on a list display screen that is included in the operation screen displayed on the display unit and displays a list of the setting information already created.

9. The image forming apparatus according to claim 8, wherein display indicating a relationship between one piece of the setting information and setting information created based on the setting information is performed on the list display screen displayed on the display unit.

10. A non-transitory computer readable medium storing a program causing a computer to execute a process, the computer controlling an image forming apparatus that operates in association with setting information with optimum values changing depending on external factors, the process comprising:
a function of displaying an operation screen for receiving an operation regarding the setting information on a display device and receiving an operation on the operation screen;
a function of, in a case where a user's input is received on the operation screen, specifying an item to be set corresponding to the user's input among setting items in the setting information;
a function of displaying the specified item on the operation screen to be identifiable with respect to other setting items; and
a function of displaying info illation regarding setting of the item in the user's input on the specified item on the operation screen, wherein the information regarding the setting is information for suggesting a setting content to be performed corresponding to the user's input.

11. An information processing apparatus comprising:
a processor configured to display an operation screen for receiving an operation regarding setting information of an image forming apparatus that operates in association with the setting information with optimum values changing depending on external factors on a display device and receive an operation on the operation screen, wherein the setting information is a file in which set values on various setting items of the image forming apparatus are recorded,
wherein the processor is configured to:
   display a creation screen that is included in the operation screen and is used to newly create the setting information, on the display device;
   receive a user's input on the creation screen and specify an item to be set corresponding to the user's input among the setting items in the setting information; and
   display the specified item on the operation screen to be identifiable with respect to other setting items.

* * * * *